July 19, 1966   A. WEINGARTEN   3,261,638
ADJUSTABLE SUN VISOR
Filed March 12, 1964   2 Sheets-Sheet 1
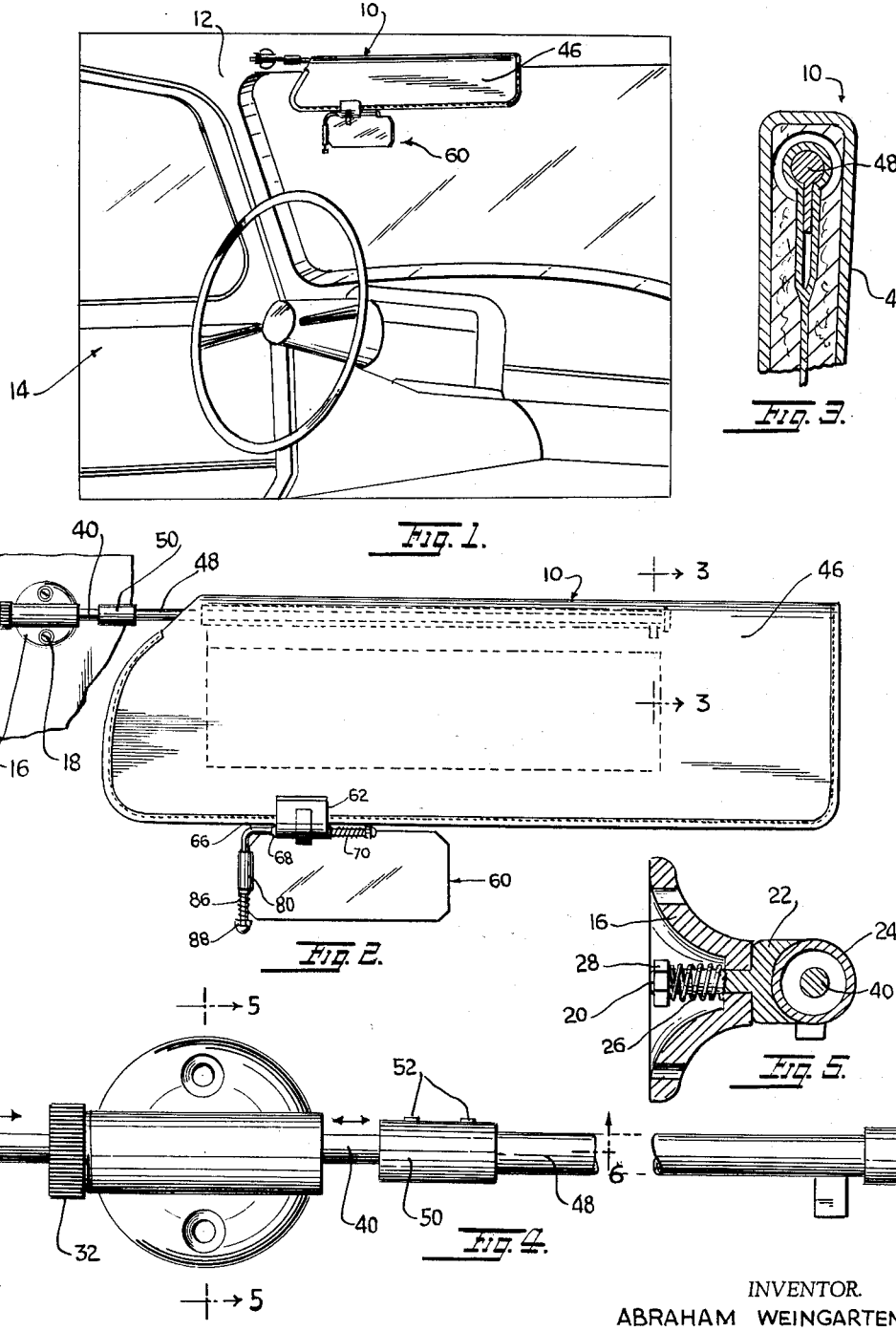
INVENTOR.
ABRAHAM WEINGARTEN

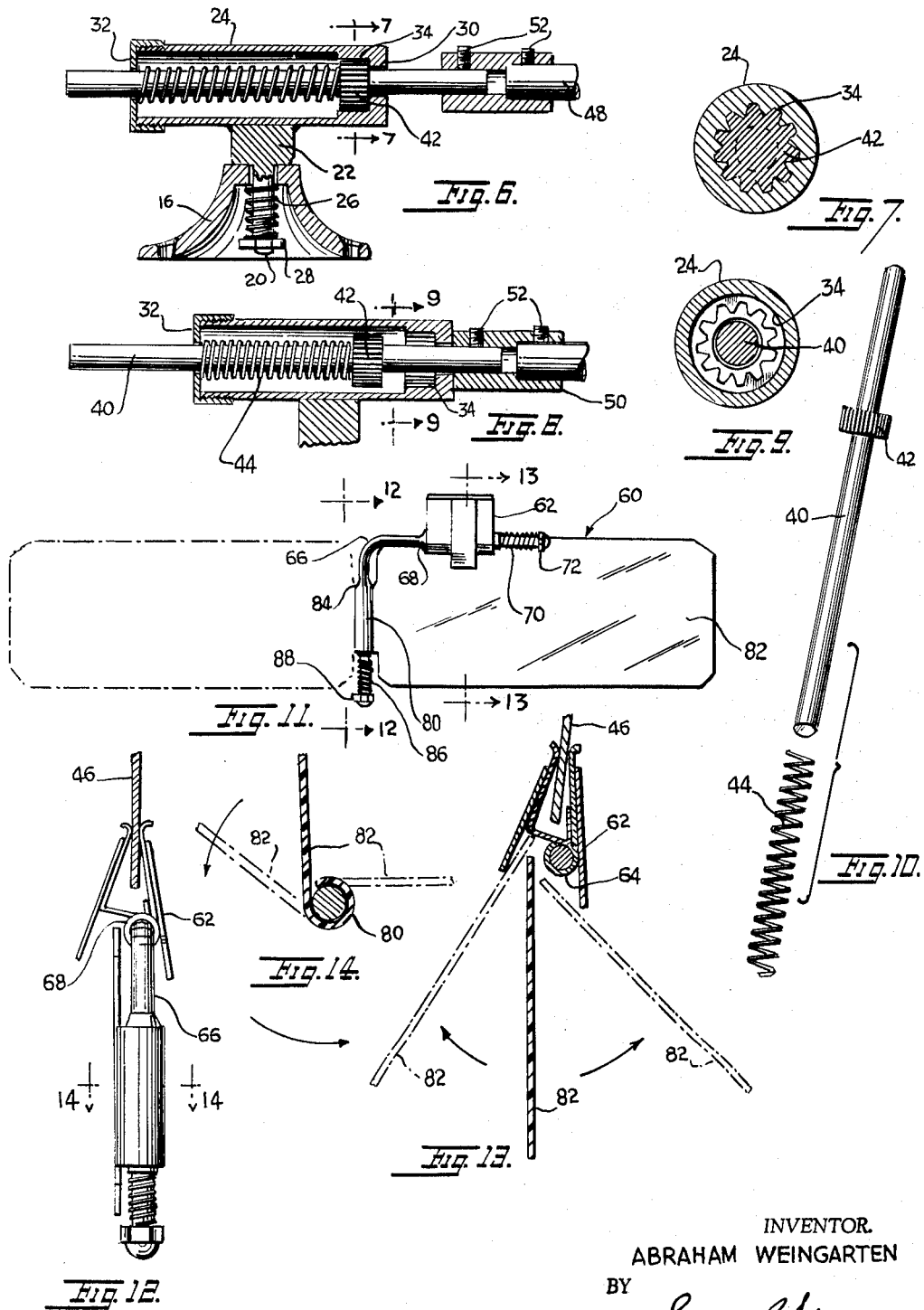

United States Patent Office 3,261,638
Patented July 19, 1966

3,261,638
ADJUSTABLE SUN VISOR
Abraham Weingarten, 74—58 260th St., Glen Oaks, N.Y.
Filed Mar. 12, 1964, Ser. No. 351,436
2 Claims. (Cl. 296—97)

This invention relates to the subject matter of my copending patent application Serial No. 264,615, filed March 12, 1963, now Patent No. 3,201,170 issued August 17, 1965. The general objectives and purposes of the present invention correspond to those set forth in said co-pending patent application. In addition there are certain important features and improvements which the present invention provides over and above those which are disclosed in said application.

Specifically, one important object of the present invention is the provision of positive-locking and quick-adjusting means for supporting a sun visor in any desired or selected position. Briefly stated, the sun visor is mounted on a rod having a toothed or serrated annular element which is fixed relative thereto. Said rod is supported within a sleeve which is swivelly mounted on a structural part of the vehicle. Within said sleeve is a toothed or serrated annular element which complements and cooperates with the toothed or serrated element on the rod. Said rod is movable both longitudinally and angularly within said sleeve, the longitudinal movement being for the purpose of causing engagement or disengagement of said toothed or serrated elements in order to lock or unlock the rod relative to the sleeve; the angular movement being for the purpose of changing or adjusting the angular position of the visor relative to the sleeve. A spring urges the two toothed or serrated elements into engagement with each other and it requires a manual effort opposed to the spring action to disengage said toothed or serrated elements.

An important feature of the invention resides in the fact that the above described locking and adjusting means may be installed in the place and stead of an existing conventional visor supporting means and a conventional visor may be mounted on said locking and adjusting means by the use of an adapter or coupling.

The invention is illustrated in the accompanying drawing in which:

FIGURE 1 is a perspective view of the inside of a motor vehicle showing the visor mechanism and filter attachment herein described and claimed.

FIGURE 2 is an enlarged face view of said visor and filter attachment.

FIGURE 3 is an enlarged fragmentary section on the line 3—3 of FIGURE 2.

FIGURE 4 is an enlarged fragmentary view of the locking and adjusting means for supporting the visor.

FIGURE 5 is a sectional view on the line 5—5 of FIGURE 4.

FIGURE 6 is a fragmentary longitudinal sectional view on the line 6—6 of FIGURE 4.

FIGURE 7 is a transverse section on the line 7—7 of FIGURE 6.

FIGURE 8 is a view similar to that of FIGURE 6 but showing the toothed or serrated locking elements disengaged from each other.

FIGURE 9 is a cross sectional view on the line 9—9 of FIGURE 8.

FIGURE 10 is an exploded view of the visor-supporting rod and the spring which cooperates therewith.

FIGURE 11 is a plan view of the filter attachment which clips on to the visor.

FIGURE 12 is an end view in the direction of arrows 12, 12 of FIGURE 11.

FIGURE 13 is a cross sectional view on the line 13—13 of FIGURE 11.

FIGURE 14 is a section on the line 14—14 of FIGURE 12.

Referring now to the details of the invention as illustrated in the drawing, it will be observed that a visor assembly 10 made in accordance with the present invention may be installed in conventional manner on a structural portion 12 of a motor vehicle 14. More specifically, a bell shaped mounting element 17 is secured to structural element 12 by means of screws 18 or other conventional fastening means. Rotatably secured to mounting 16 is a shaft 20 supporting a boss 22 having a sleeve 24 connected thereto. The boss bears against the outer end of mounting 16. A spring 26 mounted on shaft 20 bears against a shoulder formed in a recess on the inner side of said mounting 16. A nut 28 on said shaft 20 locks the spring to said shaft. It will be observed from the foregoing that sleeve 24 with its boss 22 may rotate about the longitudinal axis of mounting 16. The friction between boss 22 and said mounting, resulting from the action of spring 26, will tend to hold said sleeve and boss in place relative to said mounting.

Sleeve 24 has an annular flange 30 formed at one end thereof. A cap 32 is mounted at its opposite end and also provides an annular flange at that end. Cap 32 may be secured to sleeve 24 by any conventional means such as the screw threads shown in the drawing. Formed adjacent annular flange 30 is an annular toothed or serrated portion 34. Said annular flange 30, the annular flange provided by cap 32 and said toothed or serrated portion 34 are all concentric with each other.

A rod 40 extends through sleeve 24, being rotatably and slidably supported therein by annular flange 30 and cap 32. Secured to rod 40 is a toothed or serrated ring 42 which is engageable with the toothed or serrated portion 34 of the sleeve above mentioned. A spring 44 is mounted on rod 40 between cap 32 and toothed or serrated ring 42, the action of said spring being to urge the rod rightwardly as viewed in FIGURE 6. It will be noted that the toothed or serrated ring 42 is thereby caused to engage the toothed or serrated portion 34, locking rod 40 against rotary movement relative to sleeve 24. Said toothed or serrated ring 42 may be disengaged from the toothed or serrated portion 34 by manually forcing rod 40 leftwardly against the action of the spring to its FIGURE 8 position.

Visor 46 is mounted on supporting rod 48 in conventional manner. Supporting rod 48 may be coupled to above mentioned rod 40 by means of an adapter or coupling 50 and set screws 52. Once visor 46 is coupled to rod 40 the visor may be moved integrally with said rod 40 either longitudinally along the axis of said rod or angularly about said axis. It is therefore possible to adjust visor 46 to any desired position, both operative and inoperative and to lock it therein by means of the toothed or serrated members 34 and 42 respectively.

Filter attachment 60 includes a spring clip 62 which may be secured to visor 46 at any desired location along the lower side edge thereof or at any other convenient position thereon. Clip 62 is provided with a sleeve element 64 through which one arm of an L-shaped bracket 66 extends. An annular bead 68 is formed on said arm of the L-shaped bracket and it will be noted that it serves as a bearing with respect to one end of sleeve 64. A spring 70 mounted on said arm of the L-shaped bracket engages the opposite end of sleeve 64 and a nut 72 holds the spring in place. It is therefore possible for the L-shaped bracket to pivot about the longitudinal axis of sleeve 64, being frictionally held in any selected position about said axis by means of said spring 70.

The other arm of the L-shaped bracket 66 extends through a sleeve 80 formed at one end of a plastic filter element 82. An annular bead 84 is formed on said other arm of the L-shaped bracket to serve as a bearing with respect to one end of filter sleeve 80. A spring 86 mounted on the same arm of the L-shaped bracket bears against thet opposite end of sleeve 80 and a nut holds said spring in place. This arrangement makes it possible for filter element 82 to swivel about the longitudinal axis of its sleeve 80, sufficient friction being provided between said sleeve and annular bead 82, by means of spring 86, to hold said filter element in any selected angular position about said axis of sleeve 80.

It will appear from the foregoing that the visor and its clip-on filter element may be pivoted about a number of axes for almost universal positioning of both elements. Thus: visor 46 may pivot about the axis of shaft 20 and about the axis of rod 40; filter 82 may pivot about the axis of that arm of L-shaped bracket 66 which extends through sleeve 64 and also about the axis of the other arm of said L-shaped bracket which extends through sleeve 80.

The foregoing is illustrative of a preferred form of this invention and it will be understood that this form may be modified and other forms may be provided within the broad scope of the invention.

What is claimed is:

1. A sun visor for motor vehicles, comprising a mounting adapted to be secured to a structural part of a motor vehicle adjacent its wind-shield, a sleeve swively supported by said mounting, spring means acting between said sleeve and said mounting to cause sufficient frictional engagement between them to hold the sleeve in selected angular position relative to said mounting, a rod supported by said sleeve for axial and rotary movement relative thereto, a toothed ring in said sleeve, an annular flange in said sleeve at one end thereof and adjacent said toothed ring, a complementary toothed ring on said rod, a spring acting between said rod and said sleeve to urge said rod in one axial direction in order to cause inter-engagement between said toothed rings and thereby to lock said rod against angular movement relative to said sleeve, said annular flange limiting the movement of said rod in said axial direction such that said toothed rings do not disengage, said rod being manually movable in the opposite axial direction against the action of said spring in order to disengage said toothed rings from each other and thereby to permit angular movement of said rod to any selected position relative to said sleeve, and a visor secured to said rod.

2. A sun visor for motor vehicles in accordance with claim 1, wherein the securing means between said rod and said visor comprises a second rod extending into said visor and supporting same, and an adapter coupling said rods to each other.

References Cited by the Examiner

UNITED STATES PATENTS

| 1,958,934 | 5/1934 | Williams | 160—212 |
| 2,096,142 | 10/1937 | Stover | 296—97 |
| 2,360,183 | 10/1944 | Westrope | 296—97 |
| 2,458,677 | 1/1949 | Brundage | 296—97 |
| 2,958,559 | 1/1960 | Jensen | 296—97 |
| 3,059,961 | 10/1962 | Jacobs | 296—97 |

FOREIGN PATENTS

| 335,720 | 9/1929 | Great Britain. |

BENJAMIN HERSH, *Primary Examiner.*

J. A. PEKAR, *Assistant Examiner.*